June 6, 1967 W. F. CONRADT 3,323,297
FRUIT PICKER
Filed April 27, 1964

*INVENTOR.*
WILLIAM F. CONRADT
BY John M. Nolan
ATTORNEY

United States Patent Office 3,323,297
Patented June 6, 1967

3,323,297
FRUIT PICKER
William F. Conradt, 2945 Grand Ave.,
Davenport, Iowa 52803
Filed Apr. 27, 1964, Ser. No. 362,803
2 Claims. (Cl. 56—339)

This invention relates to a fruit picking device and more particularly to a simple device for picking tree-growing fruit, such as apples and pears, avoiding the use of ladders or scaffolds.

Similar devices have previously been devised comprising a basket attached to a handle with picking teeth projecting above the basket. However, such devices have been unsatisfactory since they have been too complicated and expensive to make, or the basket configuration allowed the picked fruit to spill out as the device was lowered, or the long handles made the device difficult to handle while picking the fruit on the lower branches. The instant invention overcomes these objections by providing a picker of simple wire construction with no moving parts, having a basket with a partially constricted opening to prevent the fruit from spilling out and having a handle adjustable in length.

Accordingly, one of the objects of the present invention is to provide a device for picking varieties of tree-growing fruit such as apples or pears.

Another object of the present invention is to provide a fruit picking device of simple and rugged construction which is easy and inexpensive to manufacture.

Still another object of the present invention is to provide a fruit picking device from which the picked fruit will not easily spill.

Still another object of the present invention is to provide a fruit picking device having a handle adjustable in length for picking fruit at different heights.

The foregoing and other objects of the invention will appear more fully hereinafter from a consideration of the detailed description which follows, taken together with the accompanying drawings wherein an embodiment of the invention is illustrated. It is to be expressly understood, however, that the drawings are for the purpose of illustration and description and are not to be construed as defining the limits of the invention.

Figure 1:
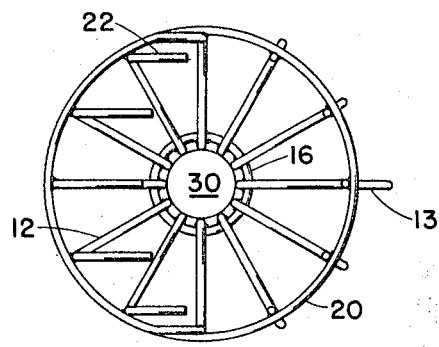
FIG. 1 is a top view of the fruit picker.
Figure 2:
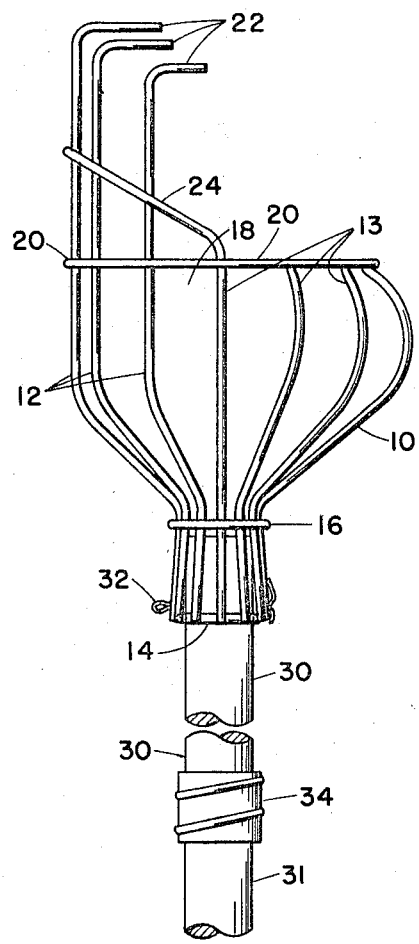
FIG. 2 is a side elevation view of the fruit picker, including the handle.
Figure 3:
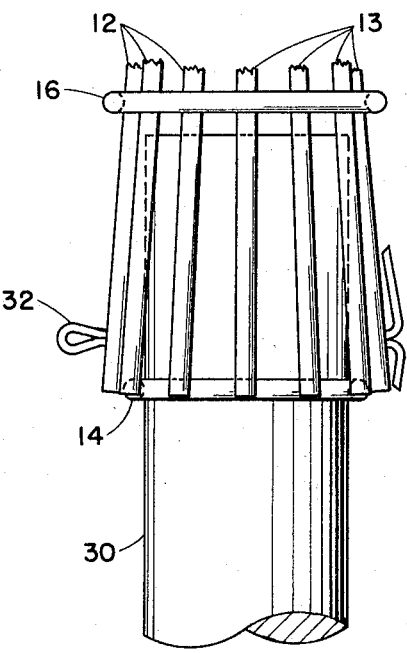
FIG. 3 is an enlarged side elevation view of the handle and handle socket.

Referring now to the drawings there is shown a fruit picker comprising a basket 10 constructed from relatively rigid wire strands 12 and 13. Wire strands 12 and 13 are fastened at one end to a terminal ring 14 at approximately equal intervals. Strands 12 and 13 are also fastened to the inside of constricting ring 16 at the same intervals forming a socket tapering slightly inward from terminal ring 14. After passing through constricting ring 16 strands 12 and 13 project upward and outward forming basket cavity 18. Strands 13 are fastened at their upper end to circular wire member 20 at approximately equal intervals along approximately one-half of the circumference of wire member 20 and are bowed outward between constricting ring 16 and wire member 20, basket cavity 18 having a larger cross section a short distance below wire member 20 than the circumference of said wire member 20.

Strands 12 are fastened to the inside of member 20 at approximately equal intervals along the other half of member 20. Strands 12 project perpendicularly above member 20 having a bend approximately 90 degrees toward the opposite side of said basket 10, terminating in teeth 22 which are approximately parallel to member 20 and to each other. Brace member 24 is fastened to each strand 12 above member 20, each end of brace member 24 being fastened to member 20.

Handle 30 is slightly smaller in diameter than the inside diameter of terminal ring 14 and is inserted through terminal ring 14 into the tapered socket formed by strands 12 and 13. Handle 30 is wedged into said socket as far as possible, being limited by the tapered sides of said socket. It is locked in this position by means of locking pin 32 inserted between strands 12 and 13 and through handle 30, immediately above terminal ring 14.

The length of handle 30 can be varied by adding or removing one or more handle extending sections 31, the end of handle 30 screwing into screw socket 34 affixed to the end of handle extending section 31.

To use the fruit picker, the handle length is adjusted to the length necessary for the operator on the ground to reach the fruit on the tree. Basket 10 is positioned immediately under the fruit to be picked. Teeth 22 are positioned immediately above said fruit, the stem being placed between adjacent teeth 22. The picker is then pulled down, teeth 22 exerting a force on the fruit until the fruit stem breaks and the fruit drops into basket cavity 18. When basket 10 is full, or becomes too heavy to manipulate with facility, it is lowered. Since the handle 30 prevents the basket 10 from being lowered vertically, the fruit tends to spill from said basket 10. However, strands 12 and teeth 22 prevent the fruit from rolling out one side and the bowed strands 13 catch the fruit in the cavity formed by the bowed strands on the opposite side, preventing the fruit from rolling out when basket 10 is tipped.

While the fruit picker as shown in the drawings is of the construction shown and described, it is understood that the instant invention is not limited to any particular form or construction. Moreover, other changes and modifications of the novel fruit picker may be made by those skilled in the art without departing from the scope of the instant invention. In the preceding detailed description certain vertical and horizontal positions of the fruit picker were used. However, the use of these positions should not be construed as limiting the scope of the invention.

I claim:

1. A fruit picker comprising a basket formed by a relatively rigid circular wire ring and a plurality of wires having one end secured at approximately equal intervals around the circumference of said ring, approximately one third of said adjacent wires extending downwardly and inwardly attaching to a relatively small horizontal wire ring and then bending vertically downward, the remaining wires extending downwardly and outwardly, curving downwardly and inwardly, also attaching to said relatively small horizontal wire ring and bending vertically downward, the degree of outward bend in said wires increasing with the distance from said first mentioned wires, forming a bulge on one side of said basket immediately below the opening, said vertically downward extending wires terminating at a second relatively small wire ring forming a socket, a relatively long handle having one end inserted in said socket, means for locking said handle in the socket, a plurality of relatively rigid wires extending upwardly from the perimeter of said first wire ring opposite the bulge in said basket and bending horizontally terminating in teeth above the center area of said basket opening.

2. A fruit picker for three growing fruit comprising a generally circular, horizontal member, a plurality of relatively rigid generally parallel teeth rigidly attached to and extending upwardly from one side of the circular member, said wires having a bent portion at their upper terminal ends extending over the opening in said circular member, said teeth forming picking means for pulling fruit from a tree; a plurality of relatively rigid wire strands rigidly attached to and depending from the circular member at substantially equal intervals, said wire strands converging downwardly to form a generally hemispherical basket for catching the fruit removed by the teeth, the circular member defining the basket opening below the teeth, the wire strands depending from the opposite side of the circular member from said teeth being bowed outwardly from the circular member before converging downwardly and inwardly to form a bulge in said basket below the circular member opposite the teeth; and an elongated handle means rigidly attached to said basket.

References Cited
UNITED STATES PATENTS

| | | | |
|---|---|---|---|
| 457,516 | 8/1891 | Marsh | 56—340 |
| 644,168 | 2/1900 | Gibbs | 56—340 |
| 753,885 | 3/1904 | Howell | 56—339 |
| 914,205 | 3/1909 | Tidd | 56—339 |
| 1,463,859 | 8/1923 | Weaver | 56—339 |
| 2,180,077 | 11/1939 | Vote | 56—339 |

ABRAHAM G. STONE, *Primary Examiner.*

RUSSELL R. KINSEY, *Examiner.*